US010047174B1

(12) United States Patent
Dimitrov et al.

(10) Patent No.: US 10,047,174 B1
(45) Date of Patent: *Aug. 14, 2018

(54) POLYMERIZATION INITIATING SYSTEM AND METHOD TO PRODUCE HIGHLY REACTIVE OLEFIN FUNCTIONAL POLYMERS

(71) Applicant: Infineum International Limited, Abingdon (GB)

(72) Inventors: Philip Dimitrov, Linden, NJ (US); Richard J. Severt, North Plainfield, NJ (US); Thomas Skourlis, Basking Ridge, NJ (US); Jeremy Weber, Brooklyn, NJ (US); Jacob Emert, Brooklyn, NY (US)

(73) Assignee: INFINEUM INTERNATIONAL LIMITED (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/635,278

(22) Filed: Jun. 28, 2017

(51) Int. Cl.
C08F 4/00 (2006.01)
C08F 2/00 (2006.01)
C08F 210/00 (2006.01)
C08F 10/00 (2006.01)
C08F 10/10 (2006.01)

(52) U.S. Cl.
CPC .................................. C08F 10/10 (2013.01)

(58) Field of Classification Search
CPC .. C08F 110/10; C08F 4/14; C08F 4/16; C08F 4/22; C08F 2500/02; C08F 2500/03; C08F 2500/04
USPC ........................ 526/90, 210, 237, 348, 348.7
See application file for complete search history.

(56) References Cited

U.S. PATENT DOCUMENTS

| | | | |
|---|---|---|---|
| 2,682,531 A | 6/1954 | Ernst et al. | |
| 3,846,392 A | 11/1974 | Matsumura et al. | |
| 3,850,897 A | 11/1974 | Priola et al. | |
| 5,254,649 A | 10/1993 | Miln et al. | |
| 5,408,018 A | 4/1995 | Rath | |
| 5,663,470 A | 9/1997 | Chen et al. | |
| 5,710,225 A | 1/1998 | Johnson et al. | |
| 5,789,335 A | 8/1998 | Chen et al. | |
| 6,211,312 B1 | 4/2001 | Holtcamp | |
| 6,346,585 B1 | 2/2002 | Johnson et al. | |
| 6,407,170 B1 | 6/2002 | Johnson et al. | |
| 6,407,186 B1 | 6/2002 | Rath et al. | |
| 6,441,110 B1 | 8/2002 | Sigwart et al. | |
| 6,562,913 B1 | 5/2003 | Baxter, Jr. et al. | |
| 6,683,138 B2 | 1/2004 | Baxter, Jr. et al. | |
| 6,753,389 B1 | 6/2004 | Rath et al. | |
| 6,846,903 B2 | 1/2005 | Wettling et al. | |
| 6,939,943 B2 | 9/2005 | Wettling et al. | |
| 7,038,008 B2 | 5/2006 | Wettling et al. | |
| 7,217,773 B2 | 5/2007 | Rath et al. | |
| 7,291,758 B2 | 11/2007 | Bohnenpoll et al. | |
| 7,683,194 B2 | 3/2010 | Krossing et al. | |
| 8,349,977 B2 | 1/2013 | Koenig et al. | |
| 8,637,619 B2 | 1/2014 | Koenig et al. | |
| 8,697,820 B2 | 4/2014 | Koenig et al. | |
| 9,034,998 B2 | 5/2015 | Faust et al. | |
| 9,156,924 B2 | 10/2015 | Faust et al. | |
| 9,631,038 B2 | 4/2017 | Faust et al. | |
| 2004/0059076 A1 | 3/2004 | Webb et al. | |
| 2008/0293900 A1 | 11/2008 | Hanefeld et al. | |
| 2009/0318624 A1 | 12/2009 | Storey et al. | |
| 2011/0201772 A1 | 8/2011 | Konig et al. | |
| 2012/0165473 A1 | 6/2012 | Koenig et al. | |
| 2013/0158217 A1 | 6/2013 | Faust et al. | |
| 2014/0275453 A1 | 9/2014 | Faust et al. | |
| 2015/0105525 A1 | 4/2015 | Faust et al. | |
| 2016/0333123 A1 | 11/2016 | Faust et al. | |

FOREIGN PATENT DOCUMENTS

| | | | |
|---|---|---|---|
| CN | 1753918 A | | 3/2006 |
| CN | 101613423 B | | 12/2009 |
| CN | 101955558 A1 | | 1/2011 |
| CN | 102007149 A | | 4/2011 |
| CN | 102046671 A | | 5/2011 |
| CN | 1020137875 A | | 7/2011 |
| CN | 101955558 | * | 10/2011 |
| EP | 0436775 A2 | | 7/1991 |
| EP | 0489508 A2 | | 6/1992 |
| EP | 2604535 A1 | | 6/2013 |
| JP | 3-203917 B2 | | 6/1995 |
| JP | 48-60784 | | 1/2012 |
| WO | WO-1994/18389 A1 | | 9/1994 |
| WO | WO-1999/07753 A1 | | 2/1999 |
| WO | WO-2002/048216 A2 | | 6/2002 |

(Continued)

OTHER PUBLICATIONS

Shiman D. I., et al., "Cationic Polymerization of Isobutylene by AlCl3/ether Complexes in Non-Polar Solvents: Effect of Ether Structure on the Selectivity of β-H Elimination", Polymer, 54: 2235-2242, (2013).
Kennedy, et al., "New Telechelic Polymers and Sequential Copolymers by Polyfunctional Initiator—Transfer Agents (Inifers)", Polymer Bulletin (1), pp. 575-580, 1979.
Liu et al., "A Cost-Effecive Process for Highly Reactive Polyisobutylenes via Cationic Polumerization Coinitiated by AlCl3", Polymer (51), pp. 5960-5969, 2010.
Morgan et al., "Sulfonium Ion Adducts from Quasiliving Polyisobutylene and Mono- or Disulfides", Macromolecules (42), pp. 2344-2352, 2009.
Nielsen et al., "Synthesis of Isobutenyl-Telechelic Polyisobutylene by Functionalization with Isobutenyltrimethylsilane", Polymer (38), pp. 2529-2534, 1997.

(Continued)

Primary Examiner — William K Cheung

(57) ABSTRACT

A method for producing highly reactive olefin polymers wherein at least 50 mol. % of the polymer chains have terminal double bonds, from an isobutylene or a mixed $C_4$ hydrocarbyl feedstock containing isobutylene. To achieve a viable process, water is added to the catalyst stream or the feedstock in the overall range of 0.05 mM to less than 5 mM per liter of feedstock.

26 Claims, No Drawings

(56) References Cited

FOREIGN PATENT DOCUMENTS

| WO | WO-2004/014968 A2 | 2/2004 |
| WO | WO-2004/058828 A1 | 7/2004 |
| WO | WO-2004/059076 A2 | 7/2004 |
| WO | WO-2008/095933 A1 | 8/2008 |
| WO | WO-2009/120551 A1 | 10/2009 |
| WO | WO-2010/008890 A2 | 1/2010 |
| WO | WO-2010/139684 A1 | 12/2010 |
| WO | WO-2006/074211 A1 | 5/2011 |
| WO | WO-2011/054785 A1 | 5/2011 |
| WO | WO-2013/021058 A1 | 2/2013 |
| WO | WO-2013/090764 A1 | 6/2013 |

OTHER PUBLICATIONS

Simison et al., "End-Quenching of Quasiliving Carbocationic Isobutylene Polymerization with Hindered Bases: Quantitative Formation of Exo-Olefin-Terminated Polyisobutylene", Macromolecules (39) pp. 2482-2487, 2006.

Vasilenko et al., "Cationic Polymerization of Isobutylene Using $AlCl_3Bu_2$ as a Coinitiator: Synthesis of Highly Reactive Polyisobutylene", Macromol. (43), pp. 5503-5507, 2010.

Kostjuk, S.V., "Recent Progress in the Lewis Acid Co-Initiated Cationic Polymerization of Isobutylene and 1,3-dienes", Roy. Soc. of Chem., 5(17): 13125-13144 (Jan. 2015).

Kumar, R. et al., "Synthesis of Highly Reactive Polyisobutylene with $FeCl_3$/Ether Complexes in Hexana, Kinetic and Mechanistic Studies", Poly. Chem., 6(2): 322-329 (Jan. 2015).

Bartelson, K.J., et al., "Cationic Polymerization of Isobutylene by $FeCl_3$/Ether Complexes in Hexenes: An Investigation of the Steric and Electronic Effects of Ethers", Polymer, 54(18): 4858-4863 (Jul. 2013).

\* cited by examiner

POLYMERIZATION INITIATING SYSTEM AND METHOD TO PRODUCE HIGHLY REACTIVE OLEFIN FUNCTIONAL POLYMERS

The invention is directed to a method for consistently producing highly reactive olefin polymers wherein at least 50 mol % of the polymer chains have terminal double bonds, from isobutylene, or a mixed $C_4$ hydrocarbyl feedstock containing isobutylene.

BACKGROUND OF THE INVENTION

Catalyst systems for cationic polymerization of isobutylene (IB) or $C_4$ streams containing isobutylene (IB) (e.g. Raffinate 1) that can produce olefinic polymers of Mn=500-3000 with a reactive vinylidene at the terminus (HR-PIB) are of high commercial value. Catalysts based on $BF_3$ complexes with alcohols or ethers have been used commercially, but they generally require low temperature and highly purified feed (U.S. Pat. No. 7,411,104 B2). Lewis acid-Lewis base complexes of aluminum halides or alkyl aluminum halides and ethers have also been disclosed in a range of media and with a variety of co-initiators. The initiators are primarily alkyl halides, $H_2O$, HCl or ROH (e.g. Macromolecules 2010, 43(13), pp 5503-5507, Polymer 2010, 51, pp 5960-5969).

Getting high monomer conversions and high vinylidene in an apolar medium (suitable for commercial scale-up) using a continuous process without elaborate feed clean-up has been elusive. Catalysts that work well in a polar medium such as dichloromethane, often do not work in an apolar saturated hydrocarbon medium (Macromolecules, 2012, 43, pp 3318-3323).

One of the advances highlighted recently is that ethers with one or more electron-withdrawing groups (e.g. bis-2-chloro-ethyl ether, CEE) were particularly useful in enabling alkyl aluminum dichloride to initiate cationic polymerization in the presence of t-butyl chloride as co-initiator giving a high yield of HR-PIB (U.S. Pat. No. 9,156,924 B2). In the absence of the electron withdrawing groups, dialkyl ethers inhibited polymerization in an apolar medium (Macromolecules, 2014, 47 (6), pp 1959-1965) either because the Lewis acid-Lewis base complexes were too strong (high binding energy) or the resulting t-butyl oxonium ions were too stable. This made the rate of polymerization too slow to be commercially viable.

Even with complexes of the appropriate binding energy, it has been found that polymerization yield and terminal vinylidene content can be inconsistent and vary with the properties of the IB, and IB-containing feedstock. Applicants have found that the presence of a small amount of water surprisingly ameliorates these inconsistencies in polymerizations carried out using alkylAlCl$_2$•CEE as catalyst and alkyl halide as initiator. The present method enables lower cost processes that can use a broader range of feedstocks. Though water itself can normally act as initiator for the polymerization of IB (US 2016/333123 A1), the presence of alkyl halide as co-initiator is necessary to control the reaction and get reasonable monomer conversions. The amount of water is also critical. Typically when water is used as an initiator for IB polymerizations, it is generally present at concentrations of 5-100, e.g 10-50 mM (US 2016/0333123 A1). However, in the presence of alkyl halide, this amount of water can cause a decrease in vinylidene end-group selectivity. On the other hand, too little water does not eliminate the inconsistent yield and terminal vinylidene content of the desired HR-PIB product.

DETAILED DESCRIPTION OF THE INVENTION

Lewis acids useful in the practice of the present invention include Lewis acids of the formula R'AlCl$_2$, wherein R' is a hydrocarbyl group, preferably a hydrocarbyl group having 1 to 12 carbon atoms, more preferably an alkyl group having 1 to 12 carbons. As used herein, the term "hydrocarbyl" means a chemical group of a compound that contains hydrogen and carbon atoms and that are bonded to the remainder of the compound directly via a carbon atom. The group may contain one or more atoms other than carbon and hydrogen ("hetero atoms"), provided such hetero atoms do not affect the essentially hydrocarbyl nature of the group.

Useful Lewis bases are dihydrocarbyl ethers wherein each hydrocarbyl group is independently selected from hydrocarbyl groups having 1 to 8 carbon atoms. The hydrocarbyl groups of the ether may be branched, straight-chained or cyclic. Where the hydrocarbyl groups of the ether are branched or straight-chained, the hydrocarbyl groups are preferably alkyl groups, more preferably alkyl groups having 1 to 4 carbon atoms. One or both hydrocarbyl groups of the dihydrocarbyl ether are substituted with an electron withdrawing group, particularly a halogen atom, preferably a chlorine atom.

The Lewis acid and Lewis base can be complexed by, for example, by dissolving the Lewis acid in a solvent selected from liquid, apolar, non-halogenated aliphatics, and liquid aromatics, such as benzene, chlorobenzene, toluene and xylene, to form a solution and then adding the Lewis base to the solution, while the solution is stirred. The complex may be added to the polymerization medium with the solvent; alternatively, the solvent may be removed prior to the addition of the complex to the polymerization medium. Preferably, the solvent is a non-halogenated aliphatic or aromatic solvent, and is more preferably xylene or toluene or mixed $C_4$ to C linear and/or branched hydrocarbons (e.g., ISOPAR™, available from ExxonMobil Corporation), most preferably toluene or mixed $C_4$ to $C_{12}$ linear and/or branched hydrocarbons. When the Lewis acid and Lewis Base are complexed in xylene or toluene, it is preferable to dissolve the Lewis base in the xylene or toluene solvent to form a solution, and then add the Lewis acid to the Lewis base solution, while the solution is stirred.

The molar ratio of Lewis acid to Lewis base in the complex will typically be maintained within a range of from about 1:1 to about 1:8, preferably from about 1:1 to about 1:8, more preferably from about 1:1 to about 1:6, such as about 1:1 to about 1:3 (e.g. about 1:1.5).

An "initiator" is defined as a compound that can initiate polymerization, in the presence or absence of adventitious water and in the presence of a proton trap. The initiator of the present invention (RX) comprises a hydrocarbyl R group, preferably an alkyl or aryl-alkyl group, wherein the carbon linking group R to X is tertiary, benzylic or allylic, preferably tertiary, which hydrocarbyl group can form a stable carbocation (e.g., t-butyl); and an X group, which is a halide, preferably chlorine.

The polymerization medium must be a substantially or completely apolar polymerization medium, such as a mixture of saturated and unsaturated $C_4$ hydrocarbons.

In the polymerization process of the present invention, the feedstock may be pure isobutylene or a mixed $C_4$ hydrocarbyl feedstock containing isobutylene, such as a $C_4$ cut resulting from the thermal or catalytic cracking operation of, for example, naphtha. Thus, suitable feedstocks will typically contain at least 10%; and up to 100% isobutylene, by mass (e.g. 20-50, based on the total mass of the feed), in addition to isobutylene, conventional $C_4$ cuts suitable for use as feedstocks that are of industrial importance typically will contain between about 5% and about 50% butene-1, between about 2% and about 40% butene-2, between about 2% and about 60% iso-butane, between about 2% and about 20% n-butane, and up to about 0.5% butadiene, all percentages being by mass, based on the total feed mass. Feedstocks containing isobutylene may also contain other non-$C_4$ polymerizable olefin monomers in minor amounts, e.g., typically less than 10%, preferably less than about 5%, and most preferably less than 1%, such as propadiene, propylene and $C_5$ olefins. The feedstock may contain various polar feed impurities such as acetone, methanol, acetonitrile, propionic acid, but will preferably be purified so that the feedstock contains less than 5 ppm, such as less than 4 ppm or 3 ppm or 2 ppm or 1 ppm or 0.5 ppm of polar impurities.

The term "polybutene", as employed herein is intended to include not only homopolymers of isobutylene, but also copolymers of isobutylene and one or more other $C_4$ polymerizable monomers of conventional $C_4$ cuts as well as non-$C_4$ ethylenically unsaturated olefin monomers containing 5 carbon atoms, provided such copolymers contain typically at least 50 mass %, preferably at least 65 mass %, and most preferably at least 80 mass % isobutylene units, based on the polymer number average molecular weight ($\overline{M}_n$).

The amount of the Lewis acid-Lewis base complex employed in the process of the present invention can be controlled, in conjunction with the concentration of initiator and monomer, reaction time and temperature, to achieve the target $\overline{M}_n$ of the polybutene polymer product, the conversion of iso-butene and yield of polybutene. In view of the above, the Lewis acid-Lewis base complex is typically employed in an amount sufficient to contact the butene monomer in a liquid phase reaction mixture at a concentration of millimoles of Lewis acid-Lewis base complex per liter of reaction mixture of from about 0.2 mM to about 200 mM, such as from about 1 mM to about 200 mM, preferably from about 5 mM to about 100 mM, and more preferably from about 10 mM to about 50 mM, such as about 10 mM to about 30 mM.

The initiator will typically be employed in a liquid phase reaction mixture comprising the iso-butene monomer at a concentration of millimoles of initiator per liter of medium, and independent from the amount of Lewis acid-Lewis base complex, of from about 1 mM to about 500 mM, preferably from about 2 mM to about 300 mM, and more preferably from about 2 mM to about 200 mM, such as about 10 mM to about 30 mM.

Water can be added at different stages of the process. It can be added with the catalyst, the initiator or the monomer itself. The presence of a small amount of aromatic solvent such as toluene can facilitate the addition of water due to the increased solubility of water in that medium relative to an all aliphatic medium. Too much toluene, however, can result in unwanted side reactions. The total amount of toluene in the final medium is preferably 0 to about 20%, more preferably, 0 to about 15%, such as 0 to about 10%. A guard bed containing molecular sieves or $CaCl_2$ to dry the feed prior to the reaction can be useful to ensure that the proper amount of water is added to the reaction. Alternatively, the water content of the feedstock can be controlled by mixing wet and dry feedstocks (that have been passed through a drying column), in a ratio required to provide the desired water content. The molar composition of water present/added to the feedstock should be less than the molar concentration that causes a decrease in vinylidene end-group selectivity, such as less than 10 mM, preferably less than 5 mM per liter of feedstock. More specifically, the amount of water present/added to the feedstock is from about 0.05 mM to less than 5 mM, preferably from about 0.1 mM to about 3 mM, more preferably from about 0.2 to about 2 mM, such as from about 0.3 mM to about 1 mM per liter of feedstock.

In an alternative embodiment of the present invention, water can be added to the Lewis acid/Lewis base complex, which is then allowed to age for a period of time before being brought into contact with the feedstock. In this embodiment (see Example 1), water may be added to the Lewis acid/Lewis base complex in an amount of from about 0.02 to about 10 equivalents of water per equivalent of Lewis acid, preferably from about 0.03 to about 0.2 (such as from about 0.05 to about 0.15) equivalents of water per equivalent of Lewis acid. Once water is added, the Lewis acid/Lewis base complex is allowed to sit for a period of time before being brought into contact with the feedstock in order to allow the water to "activate" the complex. Activation times may be from 1 minute to one day, preferably from about 2 minutes to about 3 hours, such as from about 5 minutes to about 60 minutes. Preferably, during activation, the complex is maintained at a temperature of from about −10° C. tai about 20° C.

The polymerization reaction can be performed as a batch or continuous process. On an industrial scale, the polymerization reaction is preferably conducted continuously. The continuous process can be carried out in tubular reactors, tube-bundle reactors or loop reactors, or tube or tube-bundle reactors with continuous circulation of the reaction material, or in a stirred tank reactor (glass, carbon steel or Monel preferred), a pump around loop, a plugged flow reactor or a combination thereof.

The polymerization reaction is conducted in the liquid phase to induce linear or chain-type polymerization, as opposed to ring or branch formation. Thus, if a feed is used that is gaseous under ambient temperature, it is preferred to control the reaction pressure and/or dissolve the feed in an inert solvent or liquid diluent, in order to maintain the feed in the liquid phase. Typical $C_4$ cuts comprising the feed are liquid under pressure and do not require a solvent or diluent. Typical diluents suitable for use with the process include $C_3$ to $C_5$ alkanes, such as propane, butane, pentane and isobutane.

The Lewis acid-Lewis base complex is typically introduced into the reactor as a liquid partially or completely dissolved in a solvent, or as a solid. Polymerization is preferably conducted at a pressure sufficient to maintain the $C_4$ feed in a liquid state at the reaction temperature, or at higher pressures. The initiator may be introduced to the monomer feed or the reaction mixture in liquid form together with the Lewis acid-Lewis base complex or, preferably, is introduced to the monomer feed or the reaction mixture in liquid form by a line separate from the Lewis acid-Lewis base complex addition line.

The liquid phase reaction mixture temperature is controlled by conventional means to be typically from about −30° C.' to about +50° C., preferably from about −10° C. to about +30° C., more preferably from about −5° C. to about +20° C., such as about 0° C. to about +15° C. to minimize refrigeration costs and unwanted side reactions.

In order to insure even distribution of the catalyst within the reactor, turbulent flow of the reactor contents (Reynolds number >100, preferably >1000) can be generated by mixing, or with suitable baffles, such as baffle plates or oscillating baffles, or by dimensioning the reactor tube cross sections so that a suitable flow velocity is established.

The steady state residence time of the butene to be polymerized may be from about 1 to about 300 minutes, such as 2 to about 120 minutes, preferably from about 4 to about 60 minutes or from about 5 to about 45 minutes (e.g., from about 6 to about 30 minutes).

The process of the present invention is typically conducted in a manner achieving an isobutylene conversion in the range of from about 20% up to about 100%, preferably from about 50% to about 100%, and more preferably from about 70% to about 100%, such as 80% to 100%, 90% to 100% or 95% to 100%. The combined use of temperature control and catalyst feed rate permits formation of polybutenes having a $\overline{M}_n$ of from about 400 Daltons to about 4000 Daltons, preferably from about 700 Daltons to about 3000 Daltons, more preferably from about 1000 Daltons to about 2500 Daltons; a molecular weight distribution (MWD) of typically from about 1.1 to about 4.0, preferably from about 1.5 to about 3.0, an exo-olefin content of greater than 50 mol. %, preferably greater than 60 mol, more preferably greater than 70 mol. %, such as from about 80 mol. % to about 95 mol. %; a tetra-substituted olefin content of less than about 20 mol, such as less than about 15 mol. %, preferably less than about 10 mol. %, more preferably less than about 5 mol. %; and a chlorine content of less than about 10 mol. %, such as less than about 5 mol. %, preferably less than about 2 mol. %, more preferably less than about 1 mol based on the total moles of polymer.

Once the target molecular weight of the polymer is achieved, the polymer product can be discharged from the reactor and passed into a medium that deactivates the polymerization catalyst and terminates the polymerization. Suitable deactivation media include water, amines, alcohols and caustics. The polyisobutylene product can then be separated by distilling off the remaining $C_4$ hydrocarbons and low molecular weight oligomers. Preferably residual amounts of catalyst are removed, usually by washing with water or caustic.

In one commercially preferred embodiment (from a standpoint of performance, environmental impact and cost), the Lewis acid is R'AlCl$_2$, wherein R is $C_1$ to $C_4$ hydrocarbyl, specifically, MeAlCl$_2$, EtAlCl$_2$ (EADC), iso-BuAlCl$_2$ or n-BuAlCl$_2$, the Lewis base is a chlorinated dihydrocarbyl ether (CEE), the solvent is ISOPAR or toluene, and the complex is formed by dissolving the Lewis base hi the solvent to form a solution and then adding the Lewis acid to the Lewis base solution in an amount such that the molar ratio of Lewis acid to Lewis base in the complex is from about 1:1 to about 1:1.5.

This invention will be further understood by reference to the following examples, which are not intended, and should not be construed as listing all possible embodiments within the scope of the invention.

EXAMPLES (RESULTS SUMMARIZED IN TABLE 1)

Example 1

Ethyl aluminum dichloride (EADC)•chlorinated dihydrocarbyl ether (CEE) complex was prepared in a $N_2$ atmosphere glove box. An appropriate amount of EADC in hexane (1M) was mixed with CEE in a 1:2 molar ratio. Toluene containing 0.075 equivalents of $H_2O$ relative to EADC was added to the complex to form a 0.1M complex solution. The catalyst solution was delivered to the CSTR via a SS syringe pump. The initiator was delivered as a tBuCl solution in hexane via another SS Syringe pump. The feed, synthetic Raffinate-1 containing 40% TB, was passed through a 3 A and AZ300 column before introduction into the CSTR. The Raffinate-1 feed had less than 0.5 ppm polar (oxygenate) impurities, as determined by ASTM D7423. The initial concentrations of reagents were [H$_2$O]=0.73 mM, [EADC]=0.011, [CEE]=0.02M, [tBuCl]=0.0025M, before reaching a final steady state concentration of IB of 28% after three residence times of 38 minutes. Mixing in the reactor was provided by a rotating 1000 rpm impeller. The pressure in the reactor was maintained to 50 prig and the polymerization temperature was 4° C. The reaction mixture at the CSTR exit was quenched at 4° C. with a mixture of isopropanol/water (80/20, v/v). 72% monomer conversion was observed, Mn(GPC)=1900, PDI=3.1, Exo-olefin functionality was 82%, determined by 13C NMR.

Example 2 (Comparative)

Example 2 was performed as in Example 1, except that no H$_2$O was added to the EADC•CEE complex. Conversion of IB of only about 1% was observed at steady state.

Example 3 (Comparative)

Example 3 was performed with the Example 1 reagent concentrations, in a 60 minute minibatch run. EADC•CEE was 1:1.5, water was added to the feed [H$_2$O]=0.48 mM, and no tBuCl initiator was added. No yield was observed.

Example 4 (Comparative)

Example 4 was performed with the Example 1 reagent concentrations, in a 60 minute minibatch run. EADC•CEE was 1:1.5, water was added to the feed [H$_2$O]=1.2 mM, and no tBuCl initiator was added. 6% IB conversion was observed.

Example 5

Example 5 was performed in the same manner as Example 1, except that [tBuCl]=0.01M. 84% monomer conversion was observed and the final HR PIB had Mn=1315, PDI=2.5, and exo-olefin functionality of 79% determined by 13C NMR.

Example 6

Example 6 was performed in the same manner as Example 5, except that EADC and CEE concentrations were twice as high. 76% IB conversion was observed, and the final HR PIB product had Mn=1300, PDI=2.5, and exo-olefin content of 82% determined by 13C NMR.

Example 7

Example 7 was performed in the same manner as Example 5 except that EADC and CEE concentrations were three times lower. 84% IB conversion was observed, and the final HR PIB product had Mn=2014, PDI=2.9, and exo-olefin content of 71% determined by 13C NMR.

TABLE 1

| Ex. | Added H₂O (mM) | [EADC] (M) | [CEE] (M) | [tBuCl] (M) | IB conv (%) | Exo(%)* (NMR) | Mn (NMR) | Mn (GPC) | PDI (GPC) |
|---|---|---|---|---|---|---|---|---|---|
| 1 | 0.73 | 0.01 | 0.02 | 0.0025 | 72 | 82 | 2300 | 1900 | 3.1 |
| 2 | 0 | 0.01 | 0.02 | 0.01 | 1 | n.d. | n.d. | n.d. | n.d. |
| 3 | 0.48 | 0.01 | 0.015 | 0 | 0 | n.d. | n.d. | n.d. | n.d. |
| 4 | 1.2 | 0.01 | 0.015 | 0 | 6 | n.d. | n.d. | n.d. | n.d. |
| 5 | 0.73 | 0.01 | 0.02 | 0.01 | 84 | 79 | 1550 | 1315 | 2.5 |
| 6 | 0.73 | 0.02 | 0.04 | 0.01 | 76 | 82 | 1300 | 1140 | 2.5 |
| 7 | 0.73 | 0.0033 | 0.066 | 0.01 | 84 | 71 | 2600 | 2014 | 2.9 |

While certain representative embodiments and details have been provided to illustrate the invention, it will be apparent to the skilled artisan that various product and process changes from those disclosed herein may be made without departing from the scope of the present invention. The appended claims define the scope of the invention All cited patents, test procedures, priority documents, and other cited documents are fully incorporated by reference to the extent that such material is consistent with this specification and for all jurisdictions in which such incorporation by reference is permitted.

Certain features of the present invention are described in terms of a set of numerical upper limits and a set of numerical lower limits. This specification discloses all ranges formed by any combination of these limits. It is to be understood that the upper limits and lower limits, as well as range and ratio limits set forth herein may be independently combined, and that all combinations of these limits are within the scope of the invention unless otherwise indicated.

What is claimed is:

1. A process for the preparation of polybutene having an exo-olefin content of at least 50 mol. % from an isobutane or an isobutene-containing monomer feedstock, which process comprises contacting said isobutene or isobutane-containing feedstock, with a Lewis acid catalyst complexed with a Lewis base, in a substantially or completely apolar polymerization medium, and initiating polymerization of said isobutane or isobutene-containing feedstock with an initiator, wherein said Lewis acid catalyst is a Lewis acid of the formula R'AlCl$_2$, wherein R' is a hydrocarbyl group; said Lewis base is a dihydrocarbyl ether wherein each hydrocarbyl group is independently selected from hydrocarbyl groups having 1 to 8 carbon atoms and one or both hydrocarbyl groups of the dihydrocarbyl ether are substituted with an electron withdrawing group and the initiator is a compound of the formula RX, wherein X is a halide; R is a hydrocarbyl group capable of forming a stable carbocation, and wherein the carbon linking group R to group X is tertiary, benzylic or allylic; wherein the amount of water in said feedstock is controlled to be from about 0.05 mM to less than 5 mM per liter of feedstock.

2. The process of claim 1, wherein R' is an alkyl group having 1 to 12 carbons.

3. The process of claim 1, wherein said Lewis base is dihydrocarbyl ether wherein each hydrocarbyl group is independently selected from hydrocarbyl groups having 1 to 8 carbon atoms and one or both hydrocarbyl groups of the dihydrocarbyl ether are substituted with a chlorine atom.

4. The process of claim 3, wherein said Lewis base is a dihydrocarbyl ether wherein each hydrocarbyl group is independently selected from alkyl groups having 1 to 4 carbon atoms and one or both hydrocarbyl groups of the dihydrocarbyl ether are substituted with a chlorine atom.

5. The process of claim 1, wherein the Lewis acid and Lewis base are complexed in a solvent selected from a liquid, apolar, non-halogenated aliphatic solvent or a liquid, aromatic solvent.

6. The process of claim 5, wherein said solvent is mixed C$_4$ to C$_{12}$ linear and/or branched hydrocarbons, toluene or xylene.

7. The process of claim 1, wherein said apolar polymerization medium is selected from saturated C$_4$ hydrocarbons, unsaturated C$_4$ hydrocarbons, and mixtures thereof.

8. The process of claim 1, wherein said isobutene or isobutene-containing feedstock is selected from pure isobutene; a C$_4$ refinery cut containing between about 20-50% isobutene, between 5% and about 50% butene-1, between about 2% and about 40% butene-2, between about 2% and about 60% iso-butane, between about 2% and about 20% n-butane, and up to about 0.5% butadiene, wherein all percentages are by mass, based on the total mass of the C$_4$ refinery cut; and mixtures of pure isobutene and said C$_4$ refinery cut.

9. The process of claim 1, wherein the amount of water in said feedstock is controlled to be an amount of from about 0.2 to about 2 mM per liter of feedstock.

10. The process of claim 1, wherein said complex is contacted with said isobutene or isobutene-containing feedstock at a concentration of millimoles of Lewis acid-Lewis base complex per liter of feedstock of from about 0.2 mM to about 200 mM.

11. The process of claim 1, wherein the polymerization process is conducted continuously.

12. The process of claim 1, wherein said polybutene product has an exo-olefin content of at least 70 mol. %.

13. The process of claim 1, wherein said polybutene product has a number average molecular weight (M$_n$) of from about 400 Daltons to about 4000 Daltons.

14. A process for the preparation of polybutene having asp exo-olefin content of at least 50 mol. % from an isobutene or an isobutene-containing monomer feedstock, which process comprises contacting said isobutene or isobutene-containing feedstock, with a Lewis acid catalyst complexed with a Lewis base, in a substantially or completely apolar polymerization medium, and initiating polymerization of said isobutene or isobutene-containing feedstock with an initiator, wherein said Lewis acid catalyst is a Lewis acid of the formula R'AlCl$_2$, wherein R' is a hydrocarbyl group; said Lewis base is a dihydrocarbyl ether wherein each hydrocarbyl group is independently selected from hydrocarbyl groups having 1 to 8 carbon atoms and one or both hydrocarbyl groups of the dihydrocarbyl ether are substituted with an electron withdrawing group and the initiator is a compound of the formula RX, wherein X is a halide; R is a hydrocarbyl group capable of forming a stable carbocation, and wherein the carbon linking group R to group X is tertiary, benzylic or allylic; wherein from about 0.02 to about 10 equivalents of water per equivalent of Lewis acid is added to the Lewis acid/Lewis base complex at least one minute prior to the introduction of the Lewis acid/Lewis base complex into said feedstock.

15. The process of claim 14, wherein R' is an alkyl group having 1 to 12 carbons.

16. The process of claim 14, wherein said Lewis base is dihydrocarbyl ether wherein each hydrocarbyl group is independently selected from hydrocarbyl groups having 1 to 8 carbon atoms and one or both hydrocarbyl groups of the dihydrocarbyl ether are substituted with a chlorine atom.

17. The process of claim 16, wherein said Lewis base is a dihydrocarbyl ether wherein each hydrocarbyl group is independently selected from alkyl groups having 1 to 4 carbon atoms and one or both hydrocarbyl groups of the dihydrocarbyl ether are substituted with a chlorine atom.

18. The process of claim 14, wherein the Lewis acid and Lewis base are complexed in a solvent selected from a liquid, apolar, non-halogenated aliphatic solvent or a liquid, aromatic solvent.

19. The process of claim 18, wherein said solvent is mixed $C_4$ to $C_{12}$ linear and/or branched hydrocarbons, toluene or xylene.

20. The process of claim 14, wherein said apolar polymerization medium is selected from saturated $C_4$ hydrocarbons, unsaturated $C_4$ hydrocarbons, and mixtures thereof.

21. The process of claim 14, wherein said isobutene or isobutene-containing feedstock is selected from pure isobutene; a $C_4$ refinery cut containing between about 20-50% isobutene, between 5% and about 50% butene-1, between about 2% and about 40% butene-2, between about 2% and about 60% iso-butane, between about 2% and about 20% n-butane, and up to about 0.5% butadiene, wherein all percentages are by mass, based on the total mass of the $C_4$ refinery cut; and mixtures of pure isobutene and said $C_4$ refinery cut.

22. The process of claim 14, wherein from about 0.03 to about 0.2 equivalents of water per equivalent of Lewis acid is added to the Lewis acid/Lewis base complex at least one minute prior to the introduction of the Lewis acid/Lewis base complex into said feedstock.

23. The process of claim 14, wherein said complex is contacted with said isobutene or isobutene-containing feedstock at a concentration of millimoles of Lewis acid-Lewis base complex per liter of feedstock of from about 0.2 mM to about 200 mM.

24. The process of claim 14, wherein the polymerization process is conducted continuously.

25. The process of claim 14, wherein said polybutene product has an exo-olefin content of at least 70 mol. %.

26. The process of claim 14, wherein said polybutene product has a number average molecular weight ($M_n$) of from about 400 Daltons to about 4000 Daltons.

* * * * *

UNITED STATES PATENT AND TRADEMARK OFFICE
CERTIFICATE OF CORRECTION

PATENT NO. : 10,047,174 B1
APPLICATION NO. : 15/635278
DATED : August 14, 2018
INVENTOR(S) : Dimitrov et al.

Page 1 of 1

It is certified that error appears in the above-identified patent and that said Letters Patent is hereby corrected as shown below:

In the Claims

Column 7, in Claim 1, Line 2, delete "isobutane" and insert therefore --isobutene--.

Column 8, in Claim 14, Line 1, delete "asp" and insert therefore --an--.

Signed and Sealed this
Second Day of October, 2018

Andrei Iancu
*Director of the United States Patent and Trademark Office*